United States Patent [19]
Khalidi et al.

[11] Patent Number: 5,396,614
[45] Date of Patent: Mar. 7, 1995

[54] METHOD AND APPARATUS FOR A SECURE PROTOCOL FOR VIRTUAL MEMORY MANAGERS THAT USE MEMORY OBJECTS

[75] Inventors: Yousef A. Khalidi, Sunnyvale; Michael N. Nelson, San Carlos, both of Calif.

[73] Assignee: Sun Microsystems, Inc., Mountain View, Calif.

[21] Appl. No.: 904,226

[22] Filed: Jun. 25, 1992

[51] Int. Cl.⁶ .............................................. G06F 13/12
[52] U.S. Cl. .................................. 395/425; 395/650; 364/DIG. 1; 364/966.6; 364/968.0
[58] Field of Search ................ 395/425, 650, 400; 364/DIG. 1

[56] References Cited

U.S. PATENT DOCUMENTS

| | | | |
|---|---|---|---|
| 4,899,275 | 2/1990 | Sachs et al. | 395/425 |
| 5,297,285 | 3/1994 | Kelly, Jr. et al. | 395/650 |

OTHER PUBLICATIONS

"Exporting a User Interface to Memory Management from a Communications–Oriented Operating System", M. Young.

"MACH 3 Kernel Principles", K. Loepere, Open Software Foundation and Carnegie Mellon University, Mar. 15, 1991

"Mach: A New Kernel Foundation for UNIX Development", M. Accetta et al., Jul. 1986, pp. 93–112.

"Generic Virtual Memory management for Operating System Kernels", V. Abrossimov et al., Dec. 3–6, 1989.

*Primary Examiner*—Reba I. Elmore
*Assistant Examiner*—Sheela N. Nadig
*Attorney, Agent, or Firm*—Erwin J. Basinski

[57] ABSTRACT

The present invention is a method and apparatus for efficiently using existing cache memory in a virtual memory computer system for servicing different demands for such memory. Moreover, the method and apparatus of the present invention, provides a way for authenticating untrusted virtual memory managers (VMMs) and untrusted pagers, which use and supply such caching services. The method and apparatus for authenticating the VMM and pagers can be practiced in an object oriented programming environment or in a non-object oriented environment.

34 Claims, 7 Drawing Sheets

CACHE OBJECT — PAGER OBJECT PAIRING

BASIC VIRTUAL MEMORY DIALOG—MACH

MACH
PRIOR ART
FIGURE 1

FIGURE 7
CACHE OBJECT – PAGER OBJECT PAIRING

METHOD AND APPARATUS FOR A SECURE PROTOCOL FOR VIRTUAL MEMORY MANAGERS THAT USE MEMORY OBJECTS

BACKGROUND OF THE INVENTION

1. Field of the Invention

This invention relates in general to the fields of Computer Operating Systems, Multi-processor Hardware Systems, Object Oriented Programming, and Virtual Memory Systems. In particular, the invention relates to improved techniques for establishing and handling trusted connections and relationships between a virtual memory manager ("VMM") and a supporting pager or file system ("pager"), and to improved methods of virtual memory management using objects.

2. Background Art

As computer systems have evolved, the need to manage scarce hardware resources such as memory, has led to the development of virtual memory management techniques.

Virtual memory management arrangements generally involve a relatively small capacity semiconductor memory which is fast (called "main" memory or "real" memory), and a relatively large capacity storage device, such as a disk drive, which is inexpensive but slow (sometimes called the "backing store"). The small capacity memory is made to appear larger to the system by means of a paging mechanism which transfers data between the two separate storage entities so that the information required by the system is readily available in real memory. The transfer of data is referred to as "paging", in that the data is transferred in blocks or "pages", each of which is generally a fixed size, such as 4096 (4k) bytes, by a paging mechanism (or paging subsystem).

The paging mechanism causes a page of data to be paged into real memory in response to the occurrence of a page fault. A page hull occurs when the system requests data that is not in real memory. The page fault mechanism determines that the requested data is not in real memory, and initiates the paging operation. A page fault causes the program that is being executed, often referred to as a "process" or "thread", to be halted until the page fault is resolved by paging in the required data.

The part of the operating system which handles the paging in and out process is generally called the memory management subsystem. The memory management subsystem keeps track of what pages are in main memory, and how the real memory addresses of these pages relate to the virtual memory addresses of the user program. This is generally done through a series of related tables of data which relate the user's virtual address to a "page" number, the page number to a physical memory area called a page "frame", and the page frame to the physical memory area that contains the user's data. Other data is also maintained in these tables such as bits indicating whether processes can read, write or execute from the page, as well as other bits to support the demand paging operation itself. For example, such bits are used to indicate whether the contents of the page are "valid"; whether a process recently "referenced" a page; whether a process or thread "modified" a page; whether the operating system must create a new copy of the page when a process or thread modifies its contents (called a "copy-on-write" bit); and finally there may be "age" bits maintained by the system to indicate how long the page has been in main memory. As user processes or threads are activated and deactivated, and the related pages of data moved into and out of main memory, these tables are constantly changing and thus are dynamically maintained by the memory management system. This process is generally referred to as the "memory mapping" or "maintaining memory mappings" process.

This entire virtual memory management process can be implemented in software but frequently parts of the process are implemented in hardware. For example, in the prior art, some hardware systems implement some parts of this process, either as a separate semiconductor chip or on the same chip as the CPU, such as 1) performing the address translation from the virtual address of the running process or thread to the physical address in main memory, 2) providing memory protection so a process or thread cannot read or write the address space of another, and 3) signaling a page fault if a memory reference occurs to a page not currently resident. This unit is often called the Memory Management Unit ("MMU").

Many well known systems in the prior art implement virtual memory techniques including VMS®, MACH™, SunOS™, and the UNIX® Operating System. (VMS is a registered trademark of Digital Equipment Corporation; MACH is a trademark of Carnegie Mellon University; SunOS is a trademark of Sun Microsystems, Inc. (the assignee of the present invention), and UNIX is a registered trademark in the United States and other countries and is exclusively licensed by X/OPEN Company Ltd.

MACH presently implements virtual memory techniques in an object oriented system. In MACH, the use of a memory object to both encapsulate the mapping and attributes of a memory space and to control the communications to the memory cache object and the related paging operations can result in an inefficient use of the physical memory space used by the cache as well as related unnecessary paging operations where two or more programs or tasks or processes or threads (hereinafter "programs") are using the same memory space. These inefficiencies result from the fact that the MACH memory object creates a separate related memory cache object each time a new memory object is called, without regard for the possibility that the same data is already being paged by another memory object-memory cache object pair. Moreover, the existing MACH implementation of memory objects contains no authentication procedures to insure that a Virtual Memory Manager ("VMM") which requests a paging of data has the authorization to do so. The prior art MACH documentation suggests the possibility of constructing a "mapping server" as a third party trusted component to handle the problem of untrustworthy clients and untrustworthy servers by using a "mapping token port". The suggested mapping server is similarly inefficient as it requires an unnecessary additional server to be implemented. The development of object oriented versions of such operating systems for tightly-coupled multiprocessor systems, as well as distributed shared memory systems of heterogeneous types of computer hardware, wherein virtual memory management functions are exported to user domains and wherein programs may pass memory object handles around from client to client, makes it essential that methods to authenticate and control requests for access to common paged data areas are used.

The present invention provides a method and apparatus for improving the efficiency of paged data space usage and correspondingly reducing the processing time needed to support paged data operations by allowing memory objects to share the same pages of data even though each memory object may have different access rights to the data. This is done by separating the functionality of encapsulating the representation of memory space and the values representing the memory attributes of length and access rights, from the functionality of accessing the data contained in the memory space represented by the values encapsulated in the memory object. In addition the present invention provides a method and apparatus for supporting a new and unique protocol for establishing authenticated connections between a local node's VMM and a supporting pager.

SUMMARY OF THE INVENTION

The present invention is a method and apparatus for efficiently using existing cache memory in a virtual memory computer system, for servicing different demands for such memory. Moreover, the method and apparatus of the present invention, provides a way for authenticating untrusted virtual memory managers (VMMs) and untrusted pagers, which use and supply such caching services.

More specifically, the invention provides methods and apparatus for managing the use of memory space in a main memory unit of a virtual memory computer system which has at least one central processing unit (CPU), at least one pager and VMM, and at least one operating program, by using at least one memory object to represent a range of memory splice, length of that range, and protection access rights associated with the range of memory space, for portions of the memory space used by the executing program; by pairing at least one cache object with a pager object and associating this object pair with the memory object; and by using the cache object-pager object pair to page data into and out of the main memory for the memory object associated. This procedure separates the functionality of encapsulating the representation of memory space and its related attributes of length and access rights, from the functionality of paging the data in and out of main memory. This separation facilitates the ability to efficiently use existing caches to service new memory object demands without the necessity of creating another, redundant cache, when the memory object is different from previous ones but nevertheless requests the same underlying data. Thus the invention also provides methods and apparatus for determining whether an already existing cache object is present which caches data for the memory object which triggered the new mapping request, and if an already existing cache object is present, using that cache object and its paired pager object to service the newly requested mapping operation.

Furthermore, the present invention provides methods and apparatus to authenticate the VMMs and pagers which provide these efficient paging/caching services in an environment where both VMMs and pagers may not be trusted. The operation of the method and apparatus for pairing the cache object with the pager object include mechanisms and steps: for a pager to authenticate a VMM using the VMM's name; and for the VMM to authenticate the pager by sending the pager a unique unforgeable token created by the VMM and requiring the pager to return the token to the VMM that created it. If the VMM's name is not authenticated by the pager, the pager will deny the VMM's request for paging services. The unique unforgeable token is called in some cases a cache rights object and is associated with the one and only one cache object with which the cache rights object was created by the VMM. The VMM originally supplies the cache object and associated cache rights object to a pager in response to a pager's request to create a cache for the memory object in question. In making the request the pager sends along a pager object which will be paired with the new cache object. The methods and apparatus of the pairing operation finally provide for the VMM which is now authenticated, to receive a cache rights object from the pager in response to the VMM's original bind request, and since the VMM created the cache rights object the VMM can use it to locate the cache object which is now paired with a pager object for satisfying the data needs of the executing program which originally triggered the entire mapping request.

While the methods and apparatus for authenticating the VMM and pager are claimed in an object oriented programming environment, additional claims indicate that the method and apparatus are claimed in a non-object oriented environment as well. Additionally the method and apparatus are claimed in tightly-coupled computer systems and in loosely-coupled computer systems. Finally, computer program products which are adapted to perform the claimed methods are also claimed as embodying the disclosed invention.

DESCRIPTION OF THE DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

A method and an apparatus are disclosed for client programs to have the ability to use virtual memory management techniques in an efficient way and in a trusted environment, which is especially adapted for systems using object oriented programs. In the following description for purposes of explanation, specific data and configurations are set forth in order to provide a thorough understanding of the present invention. The preferred embodiment described herein is implemented as a portion of the Spring Object-Oriented Operating System to be released in the future by Sun Microsystems ®, Inc. (Sun Microsystems is a registered trademark of Sun Microsystems, Inc.) However, it will be apparent to one skilled in the art that the present invention may be practiced without the specific details and may be implemented in various computer systems and in various configurations, or makes or models of tightly-coupled processors or in various configurations of loosely-coupled multiprocessor systems.

In the preferred embodiment, the virtual memory system provides an architecture that separates the tasks of maintaining memory mappings and handling the memory management hardware from the tasks of paging memory in and out of the backing store. A per-node virtual memory manager ("VMM") is responsible for maintaining the mappings on the local machine while external user-level domains are responsible for managing the backing store. The architecture supports flexible memory sharing, sparse address spaces, and copy-on-write mechanisms. A natural consequence of the design is support for distributed shared memory. A sparse address space is one which consists of regions of data separated by unallocated addresses. A copy-on-write mechanism is one which causes or creates a new copy of a page when an executing program modifies the contents of the original page. The general term "executing program" shall be used herein to mean either a process (as defined in UNIX) or a task (as in MACH) or a thread (which is used by both).

A memory object is an abstraction of store (memory) that can be mapped into address spaces. An address space is the virtual memory area that can be used by an executing program. Memory objects are implemented by pagers. A "pager" is a subsystem responsible for paging data into and out of main memory. Memory object handles are passed around to clients (i.e. user or application programs) that map the memory objects into address spaces. An object "handle" is a pointer or reference to the associated object. Address spaces are represented by address space objects that are implemented by VMMs. A client holding a memory object handle can map the memory object into an address space by invoking the map operation on an address space object. The VMM that implements the invoked address space object uses the passed memory object handle to contact the pager that implements the memory object and to establish a memory cache. Requests to populate (page data in) and to empty (page data out) the cache are then made by VMM to the pager, and by the pager to VMM.

An important consideration is that of trust. In general, a given VMM does not trust a pager unless proper authentication is established, because any user process can create a pager since in this embodiment paging is no longer a function of the operating system. Similarly, a pager does not trust a VMM since memory object handles are passed around from client to client, and therefore authentication of the VMM is necessary for trusted operation.

In the preferred embodiment, it is desirable for the memory object to encapsulate other properties, such as protection properties (e.g. read-only or read-write, etc.) or length of the memory space. A pager may want to hand out a read-only memory object handle to some client while giving another client a read-write memory object handle, where both handles refer to objects which encapsulate the same underlying memory. When both clients map their respective memory objects on the same node, each client should be able to do so under the protection restrictions embodied in the memory objects, and yet it is desired to do so while using the same physical memory cached at the VMM and in a secure manner.

Figure 1:
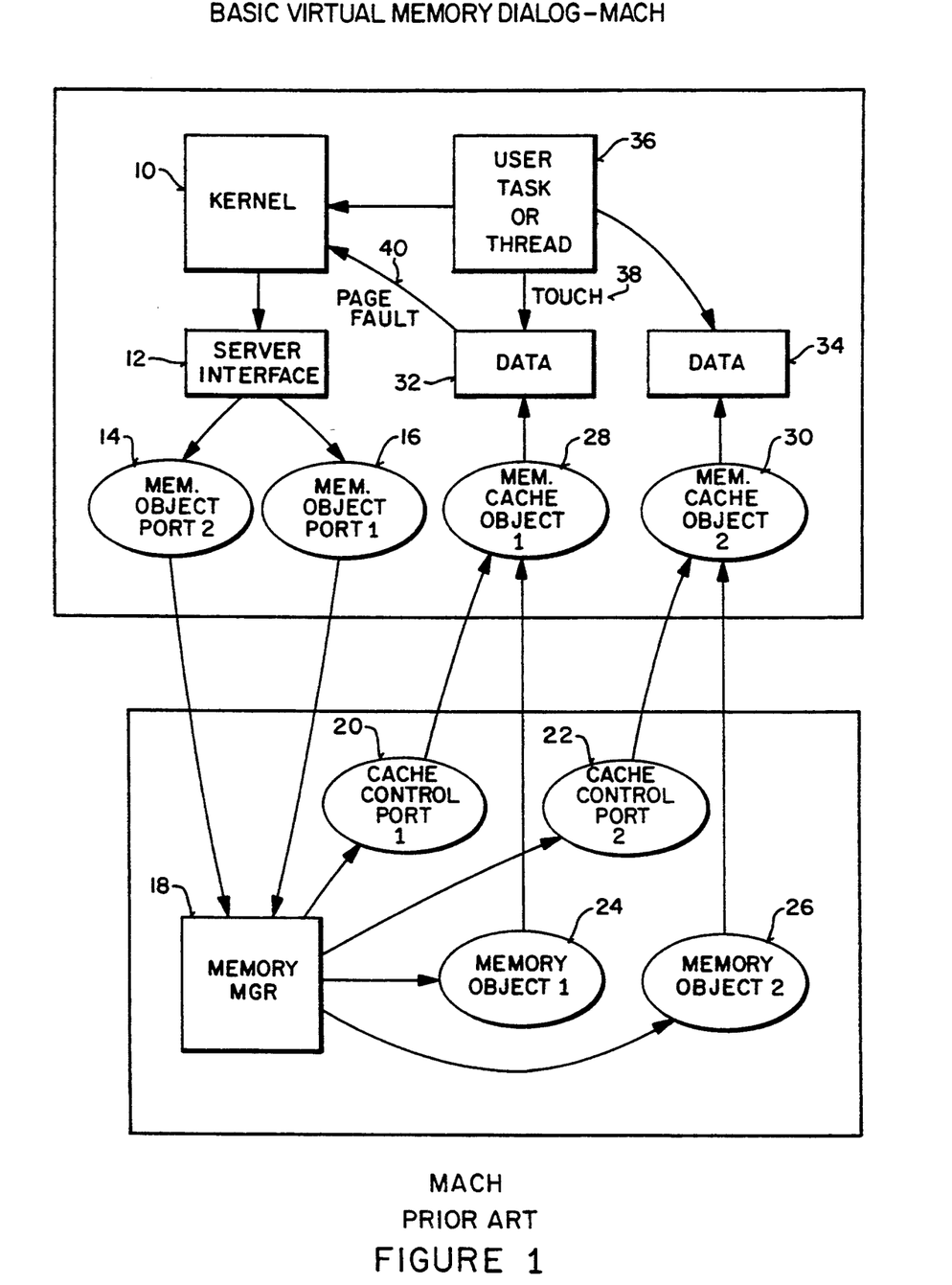
FIG. 1 illustrates the basic virtual memory operation of the MACH operating system, which is in the prior art.

The MACH system developed by Carnegie Mellon University implements a virtual memory system in an object oriented system using memory objects and has many of the features referred to above. Referring now to FIG. 1, in Mach an executing program is a task or thread. When such an executing program 36 needs to map a memory object 24 into the executing program's address space, the program calls the kernel 10 to do so. The map request is passed to the server interface 12 who send the necessary commands as messages to the memory objects port 16, which ultimately passes the message to the memory manager 18 that implements the memory object 24. The memory manager 18 sets up a connection between the memory object 24 and an associated resident kernel memory cache object 28 that represents the cache of resident pages of data 32 for that memory object 24. The memory manager 18 also has an associated cache control port 20 which was supplied to it for control of the memory cache object 28. The kernel also generates a name port (not shown) for the memory cache object 28 for use by client programs to refer to the memory cache object 28. If an abstract memory object is mapped by programs on more than one host (node), there will be many control and name ports, one for the memory cache object on each host. Moreover, a duplication in memory cache objects, and related name and control ports will occur on the same host if a second client program on that host acquires a second memory object, even if the second memory object is implemented by the same memory manager as the first memory object and both objects encapsulate the same data. This is so because in MACH, a second client program that uses the same memory object as the first will be able to share the same data. However, if the second client program acquires a different memory object the kernel will create a different cache even if the second memory object is implemented in the same memory manager as the first memory object and both memory objects encapsulate the same data. The second memory object may even have the same access rights or different access rights as the first memory object, but it does not matter as in MACH each will have a different cache because they are different memory objects. Them is no way in MACH to have two memory objects that are the same yet differ only in access mode. Referring again to FIG. 1, MACH treats a different memory object as a totally separate entity. For example, in the case described above, assume the executing program 36 (or a totally different client program on the same host) wishes to map a memory object 26 which is different from the former memory object 24 but which encapsulates the same data. The kernel 10 goes through the same process as before, contacting the server interface 12 who sends a map message to the new memory object's port 14, which is passed on to the implementing memory manager 18. The memory manager 18 makes no attempt to determine if this memory object encapsulates the same data as a previously implemented memory object, but rather sets up a new connection between the new memory object 26 and a corresponding memory cache object 30 with its associated cache control port 22. This duplication creates obviously duplicated main memory caches and related control and name ports, as well as unnecessary memory manager and kernel activity in managing two paging operations.

Figure 2:
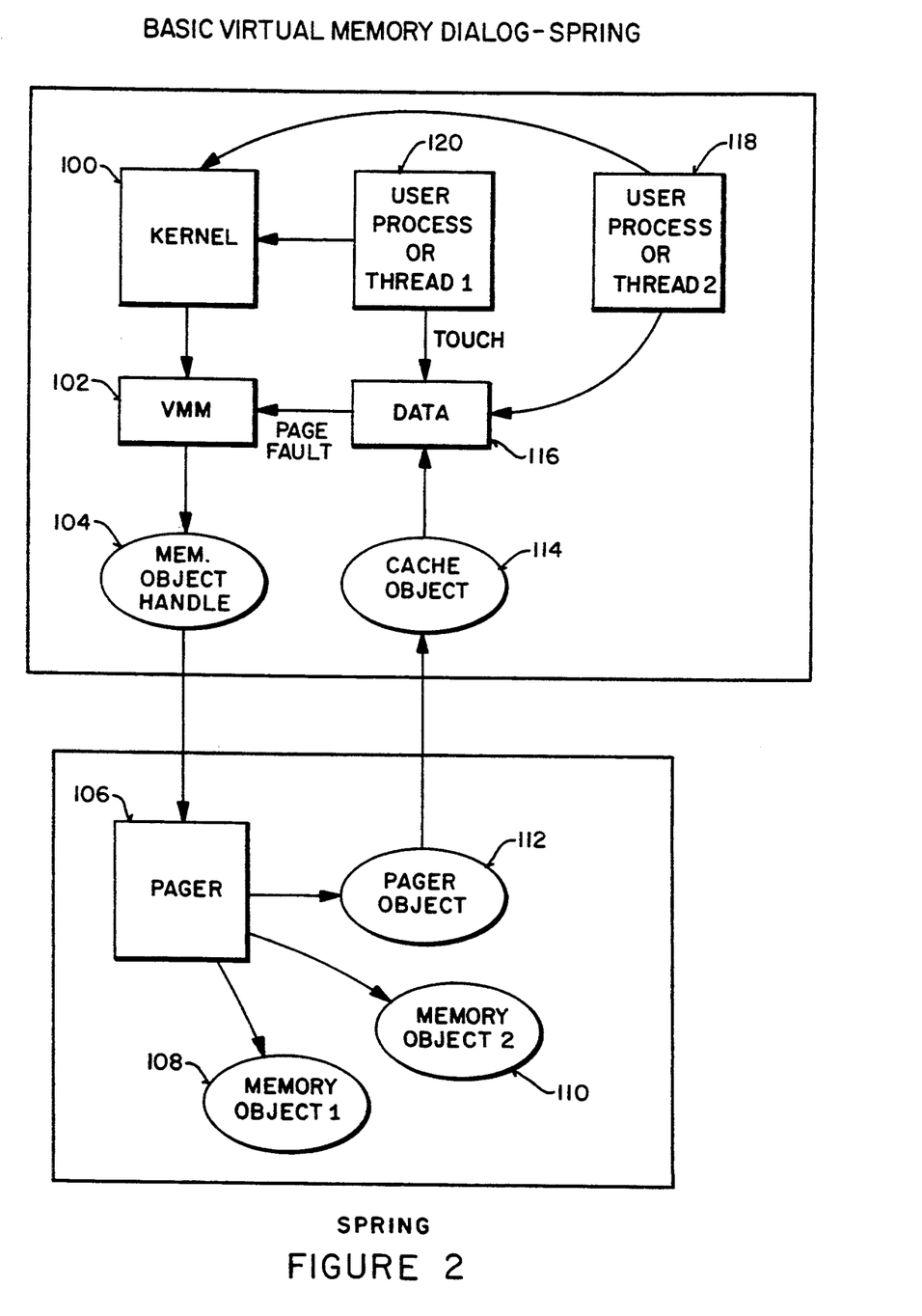
FIG. 2 illustrates the equivalent virtual memory dialog of the present invention.

In the preferred embodiment of the present invention, this problem of wasted memory space and wasted paging activity is solved by separating the functionality of encapsulating memory and memory attributes, from the functionality of accessing the memory encapsulated in the memory object. This is done by splitting the functionality of a MACH memory object into two: a spring memory object that encapsulates memory and memory attributes, and a pager object that is used to page in and out the (physical) contents abstracted by the spring memory object. Referring to FIG. 2 the process of the present invention is described which corresponds to that previously described for the MACH system. A Spring executing program (user process or thread) 120 which has obtained a handle for a memory object will request that this memory object be mapped into the program's address space. The map request is passed to the VMM 102 on that node which uses the object's handle 104 to call the pager 106 which implements the indicated memory object 108. The pager sets up a pairing of a pager object 112 and a cache object 114 at the host to perform the data paging functions and informs the requesting VMM that the mapping is completed and paging may commence. As the program 120 accesses the data 116 (this is also called "touching" the data) a page fault may occur which causes paging to happen. In this environment of the present invention, if a second program 118 requests a mapping of a different memory object 110 which encapsulates the same data, the request process is the same through the VMM 102. However the pager 106 will be able to figure out that this second memory object 110 encapsulates the same data as the previous memory object 108 and will not set up a duplicate pager object-cache object paging mechanism. The pager 106 will simply inform the VMM 102 that the mapping is complete, tell him where the data is and the second program 118 can begin to access his data. This will be true whether the second memory object had the same access rights to the data as the first memory object or had different access rights. The pager will be able to control the access rights of each client.

In addition to splitting the functionality of the MACH memory object into a memory object and a pager object, in the present invention the process of setting up the relationships between the VMM and the pager is designed to be a trusted process. This trusted relationship is established by a protocol which requires that a pager authenticate the VMM by independently checking the VMM's name with a trusted name server and by the VMM authenticating the pager by requiring the pager to return an unforgeable opaque token which was originally created by the VMM and which is of use only to the VMM that created it. There is no equivalent authentication process in MACH. Some MACH documentation in the prior art discusses the possibility of a need for authentication through possibly the use of a totally separate mapping server which is accessed by the original memory manager. However there is no implementation described or implied and the only description of the third party mapping server appears to be an added inefficiency in both setup and normal paging. As indicated however no specific implementation exists in MACH.

Figure 3:
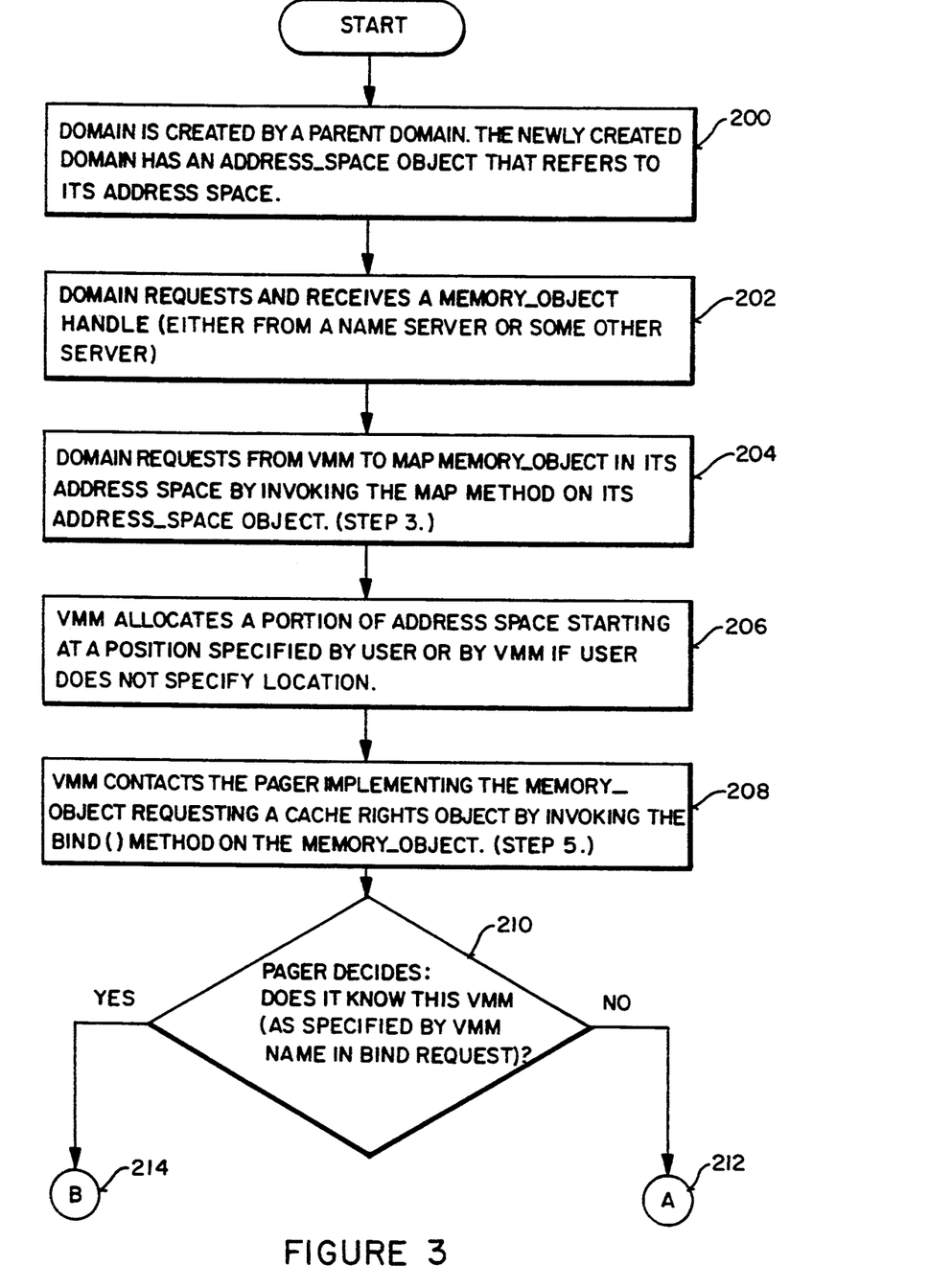
FIGS. 3, 4 and 5 illustrate a detailed flow chart of the present invention.
Figure 4:
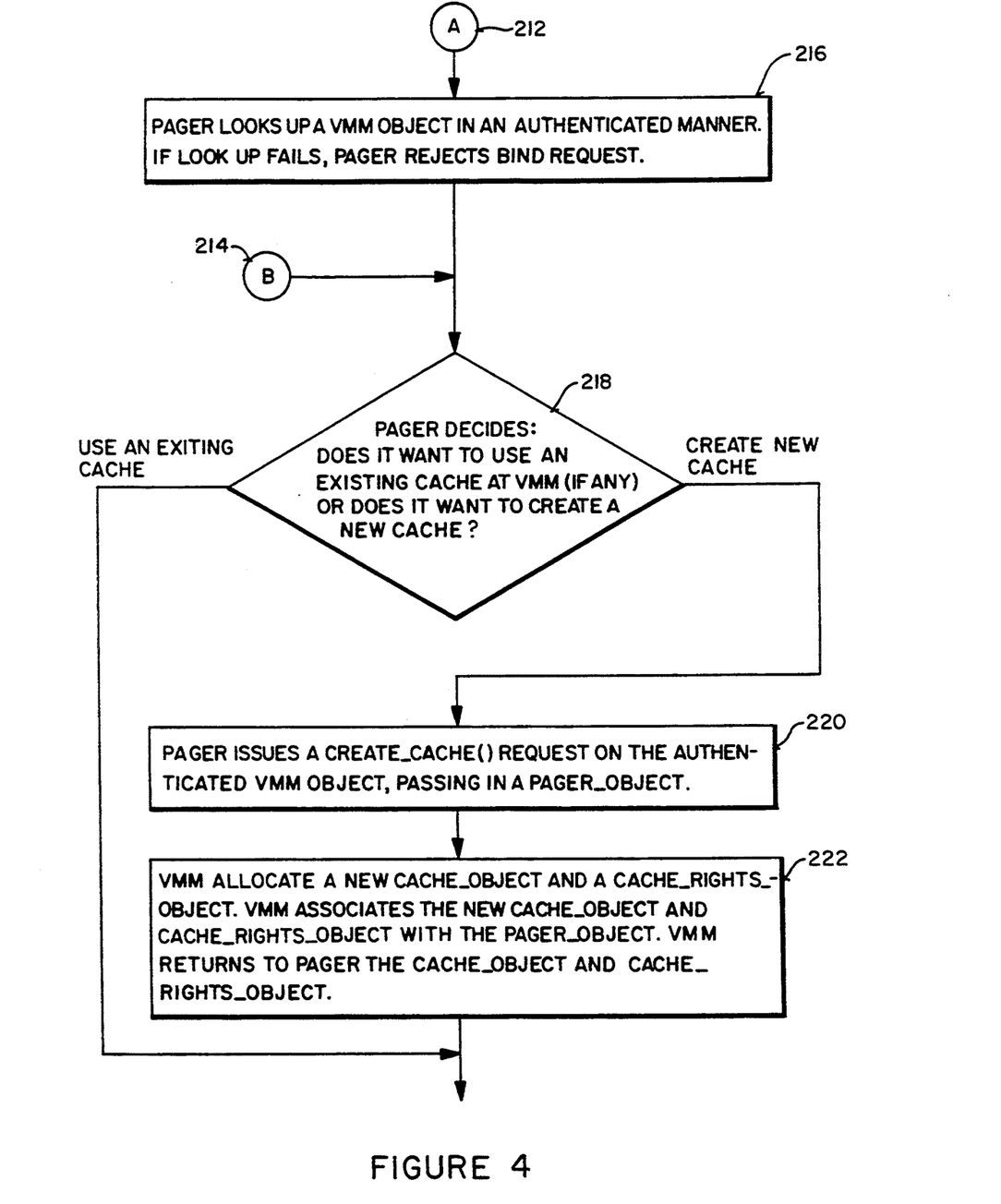
Figure 5:
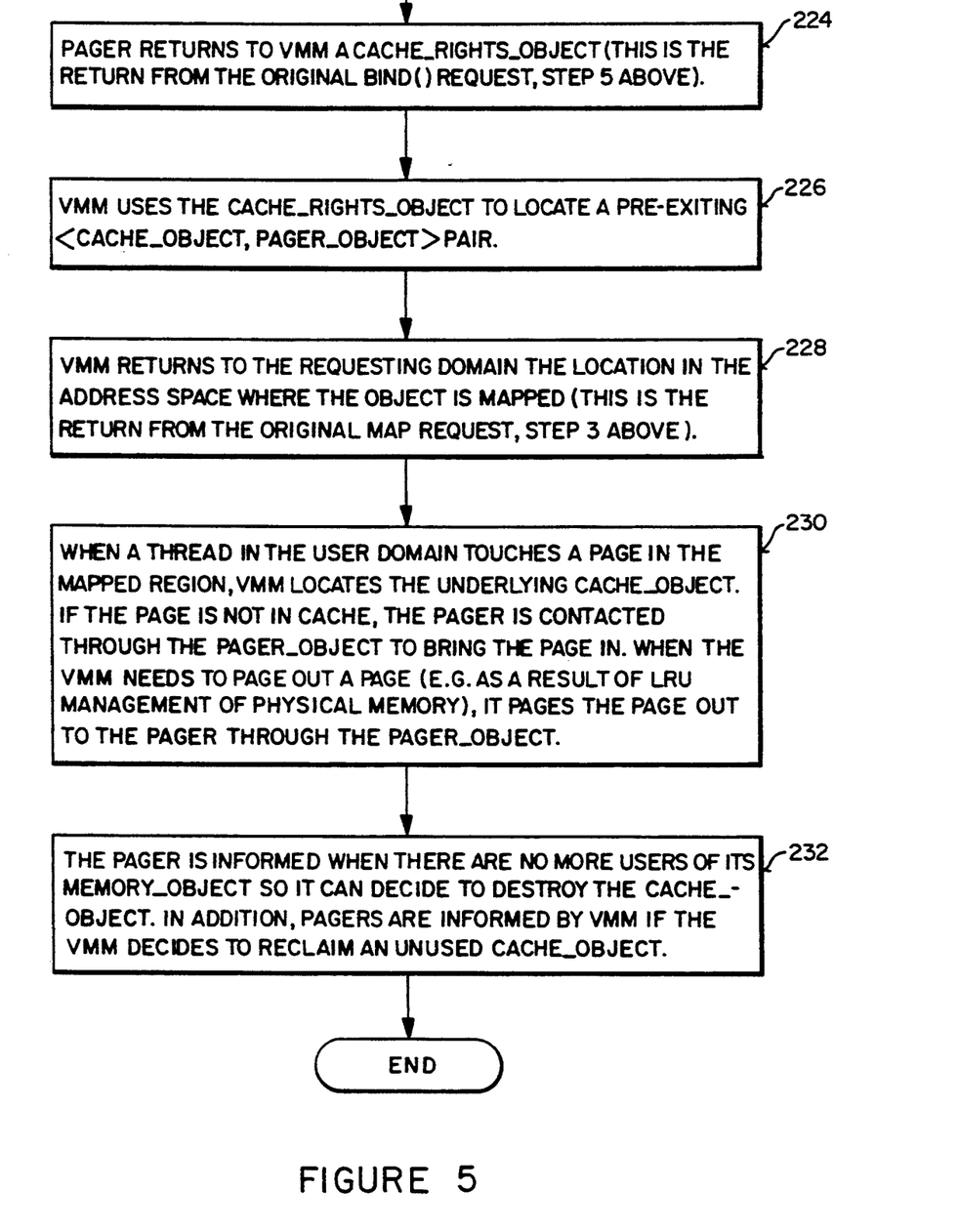

The authentication procedure of the present invention is more fully described by reference to FIGS. 3,4 & 5 which illustrates the process in its entirety. In FIG. 3 the procedure starts at block 200 where an executing program domain is initially created by some parent domain. The newly created program domain has an assigned address_space object that refers to its address space. (Address space objects are created by and obtained from VMM; operations on address space objects include mapping and unmapping memory objects into the address space, as well as methods to manipulate the address space, such as, to lock/unlock the underlying memory in core and to change the access protection of a region.) At block 202 the program domain requests and receives a memory_object handle (either from a name server or from some other server). At block 204 the program requests that the VMM which implements the address_space object, map the memory_object into its address space by invoking the map method on the address_space object. The VMM then allocates a portion of the address space starting at a position (address) specified by the program or at the position specified by the VMM if the program specifies no starting offset. (Block 206). At block 208 the VMM then contacts the pager which implements the memory_object indicated in the map request by invoking a bind ( ) method on the memory_object, supplying the VMM's name as a parameter.

Since this bind ( ) method is an essential element of the present invention, the method is described in more detail as follows:

The syntax below specifies the parameter name, followed by a colon, followed by a parameter passing mode, followed by a parameter type.

The parameter passing modes are:

copy (a copy of the argument is passed from caller to callee)

borrow (an in-out passing mode: the argument is passed from caller to callee and upon return, from callee to caller)

produce (an output passing mode: the argument is produced by the callee and passed to the caller on return from the call)

consume (object is passed from caller to callee; similar to copy. Caller no longer has access to the object).

When an error occurs, an exception is raised by the callee and no arguments are produced.

212) the pager looks up the VMM name via a trusted name server, and if the look-up fails to find the VMM name registered, the pager rejects the bind request and returns this indication to the VMM. (block 216 in FIG. 4). If the name server authenticates the VMM name the name server will return a vmm_object handle for a vmm_object implemented by the VMM name. If the pager has a record of knowing the VMM name (leg 214) or the authentication request to the name server succeeds in verifying the authenticity of the VMM name (216) the pager proceeds with the set-up process by next deciding (at block 218) whether the pager has an existing cache_object at the VMM which could be used to service the new mapping from the new bisect request, or whether the pager must set-up a new cache. Assuming that a new cache must be set up, the pager (at block 220) invokes a create_cache ( ) request method on the

```
Bind () a method on memory_object:
    //Bind is used by VMM to request from the pager responsible for this
    //memory_object a vcache_rights_object that points to vcache_object
    //that supplies the contents of the memory_object. VMM calls bind
    //each time a new mapping or copy from the memory_object
    //is to be established.
    //
    //mem_obj_offset is offset the beginning of the memory_object
    //as requested by the client that initiated the map/copy operation.
    //
    //Length_in_bytes specifies the amount of memory to map as requested
    //by the client that initiated the map/copy operation;
    //the pager may return a smaller length.
    //
    //request_access is the access.rights requested by the user that initiated
    //the map/copy; max_access_rights is returned by pager to indicate
    //the maximum access_rights of the resultant binding.
    //The VMM guarantees that it will not allow the user an access higher
    //than max_access_rights.
    bind : proc(
        my_name            : copy name.name //name of calling VMM
        request_access     : copy access_rights
        mem_obj_offset     : copy vcache.offset_t
        length_in_bytes    : borrow vcache.offset_t
        rights_to_cache    : produce vcache.rights_object
        cache_offset       : produce vcache.offset_t
        max_access_rights  : produce access_rights
) raises
        access.denied,     //request access is too high
        local_only         //pager does not want to service this VMM
                           // because it is remote
```

Returning now to FIG. 3, upon receipt of the bind ( ) request (at block 210) the pager checks its records to see if it knows the VMM name and has a vmm_object handle for a vmm_object implemented by this VMM name. If the pager has no record of the VMM name (leg vmm_object implemented by the VMM name, passing a pager_object handle as a parameter to the vmm_object. This create_cache request is more fully described as follows:

```
The create_cache_object () is a method on the vmm_object:
//Create_cache_object is called by a pager to create a new vcache_object
//at this VMM. The signal_last_ref flag instructs VMM to call
//done_with_cache () method on the pager_object that corresponds
//to this vcache_object when the last reference to it is gone.
//A reference to a vcache_object is either a bound memory_object
//or a copy_on_write from this vcache_object. info contains some
//information used in paging policies. vcache_ownership is the initial
//state of the vcache_object (vcache_objects have a state associated
//with them that is used for adjusting paging policies.)
create_cache_object : proc (
    cache_pager       : consume pager.pager_object
    signal_last_ref   : copy bool
    info              : copy pager.pager_info
    vcache_ownership  : copy vcache.ownership_t
    new_cache         : produce vcache_object.vcache_object
    rights_to_cache   : produce vcache.rights_object
) raises
    exceptions.quota_exceeded,  //quota of this pager at VMM exceeded
    access.denied   //Pager not allowed to create caches at this VMM
```

```
//(pager needs to obtain another vmm_object that
//allows him to create caches)
```

As a result of the create_cache request described above, the vmm_object creates a new cache_object and an associated cache-rights_object (at block 222) and the VMM records the connection between these new objects and the pager_object whose handle was passed to the VMM with the create_cache request. The VMM then returns the cache_object (handle) and the cache-rights_object (handle) to the pager which generates the create cache request. (A cache_object is an object that represents the VMM end of a cache-pager channel. Cache_objects are created by vmm_objects upon command of a pager, and are implemented by VMMs. Cache_objects cache memory pages that belong to pager_objects. A cache-rights_object is an object that acts as an unforgeable pointer to one and only one associated cache_object. There are no methods on this object. When passed to the VMM that created it, the cache-rights_object implicitly points to its only associated cache_object.) The pager, having received the new cache_object associated with the pager_object which the pager assigned to it earlier, is now able to make a return to the original bind ( ) request from the VMM. It should be noted that the pager would have been able to make this response if it had earlier decided (at block 218) that it did indeed have an existing cache that could service the original bind ( ) request. If the pager had found an existing cache the pager would have gotten the associated cache-rights_object from its records to return to the VMM. So at this point, the pager has a cache-rights_object ready to return to VMM, whether it had gotten the cache-rights_object earlier when it set up the original cache (which is about to be used by the new request) or had just received a new cache-rights_object as a result of the new cache set-up. Continuing now on FIG. 5 at block 224 the pager returns from the original bind ( ) request (block 208) sending to the VMM who made the original bind request, a cache-rights_object. If the pager is an untrusted pager and sends the return to a VMM which did not make the original request, that VMM cannot use the cache set-up because this VMM did not create the cache-rights_object (pointer) which the pager returned and therefore does not have the one and only one cache_object to which this cache-rights_object points. However, by returning the cache-rights_object to the originating VMM, the VMM uses the cache-rights_object (block 226) to locate the pre-existing cache_object-pager_object pair which will service the paging of data for the program that made the request to map originally. If for some reason the cache-rights_object is bogus (i.e. does not point to a cache_object), the VMM fails the original mapping request (204 in FIG. 3) that initiated the bind request. If a cache_object is found, the VMM then returns from that original map request to the program, indicating the location in the address space where the memory object is mapped (block 228). When an executing program in the program domain references a location (touches) in a page in the mapped region, VMM locates the underlying cache_object. If the page containing the referenced data is not in the cache a page fault occurs and the pager_object is contacted to bring the page into the cache. (230) Similarly, if the VMM needs to page out a page the pager_object is contacted to remove the page from the cache. Various other cache management activities (block 232) occur between VMM and the pager.

Accordingly, the authentication protocol of the bind ( ) procedure as well as the procedure for using existing caches for new mapping requests wherever possible have been described. Thus it can be seen that the current invention enables the encapsulation of properties in different memory objects that abstract the same underlying memory, permitting the memory objects to be implemented by a pager that is not trusted by the VMM and passed to tie,trusted clients, such that when the clients map the memory objects on the same node, they can do so without violating protection restrictions embodied in the memory objects, while using the same underlying cached memory.

Figure 6:
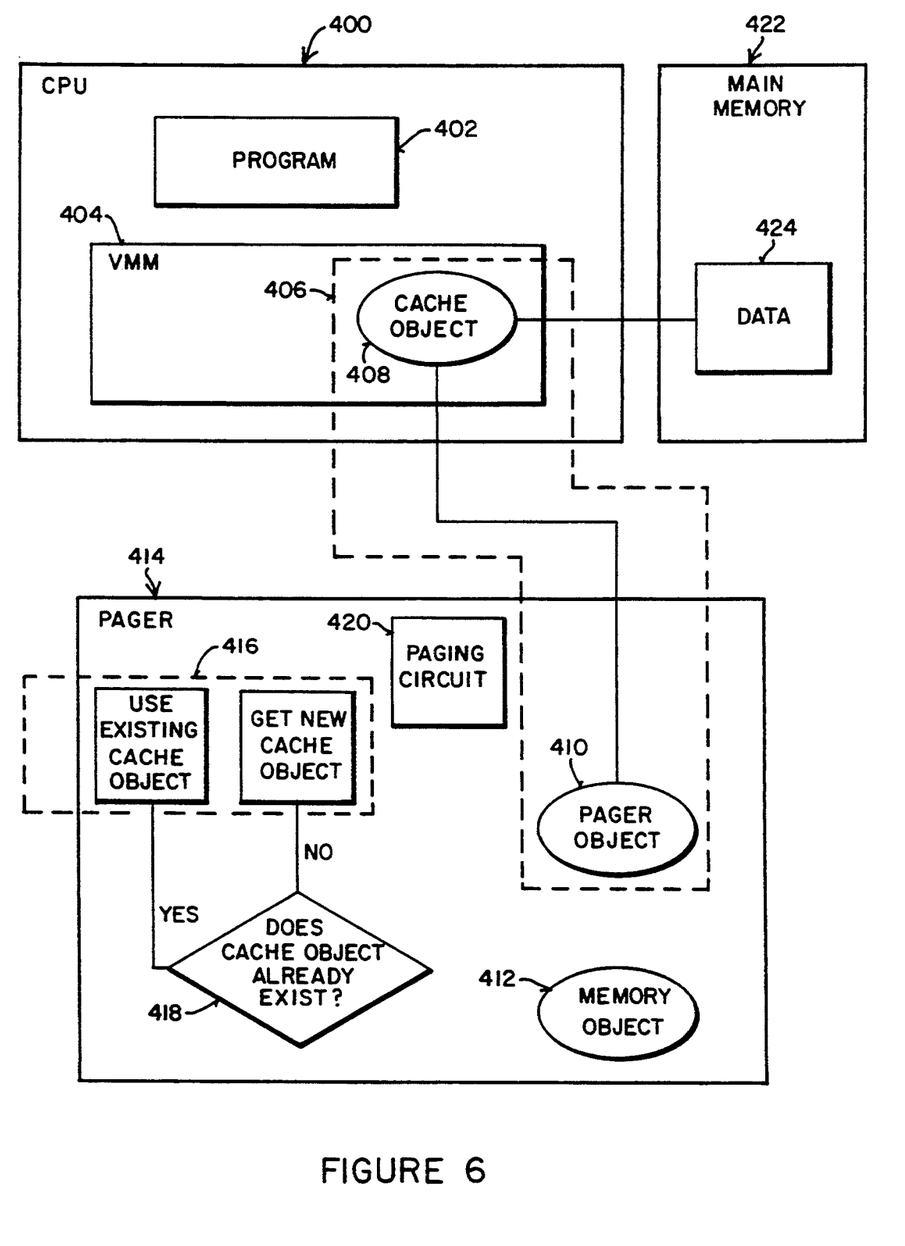
FIG. 6 illustrates an alternate embodiment of CPU-Pager-Main Memory connections relative to the invention.

While the preceding disclosure describes the preferred embodiment in terms of the methods employed it is clear to those skilled in the arts that some parts, if not all of this invention may be implemented in hardware structure. As alternative embodiments, consider the following descriptions. Referring to FIG. 6, a computer system CPU 400 and pager 414 are shown. The CPU contains an executing program 402 and a VMM 404. A memory object 412, which represents the range of memory space used by the program 402 and which also encapsulates values representing the length of the memory space and the protection access rights to the memory space, is shown in the pager 414. Also shown is a pairing device 406 which is used for pairing a cache object 408 in the VMM 404 with a pager object 410 in the pager 414. This cache object-pager object pair 408 & 410, are used by the paging circuitry 420 in the pager 414 to move data into and out of the assigned data area 424 in main memory 422. In addition, the pager 414 is shown to have a first detection device 418 used to determine whether a cache already exists to service the needs of the memory object 412 for caching data for the executing program 402. Also shown is additional circuitry 416 in the pager 414 for using the already existing cache object and its pager object pair if they are present or for getting a new cache object if one does not already exist.

Figure 7:
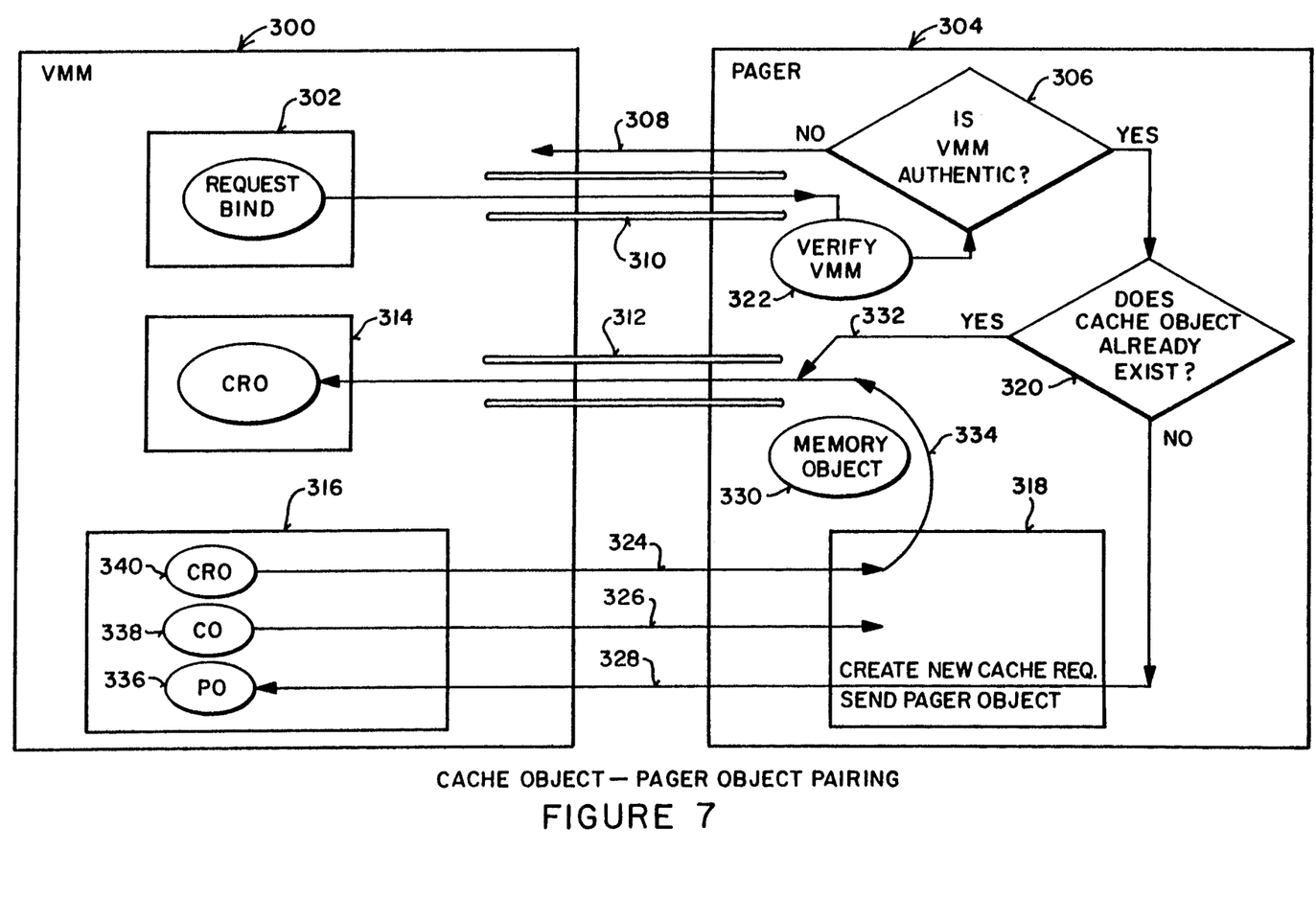
FIG. 7 illustrates a more detailed view of an embodiment of the cache object-pager object pairing operation.

The pairing device 406 shown in FIG. 6 is now more fully described by reference to FIG. 7. A first communications mechanism 310 connects the VMM 300 to the pager 304 whereby the VMM 300 may invoke a bind method on the memory object 330 in the pager 304, by means of the bind request 302. On receipt of the bind request a second detection device 322 in the pager 304 verifies the VMM name which was included with the bind request. If the VMM name is found to be unverified by additional pager circuitry 306, the bind request is rejected and the VMM notified 308. If the VMM name is found to be authentic a third detection device 320 in the pager 304 determines whether an already existing cache object is present which can service the data needs of the memory object 330 which triggered the bind request 302, and if so, returning to the VMM 300 an existing cache-rights-object 332 which points to the already existing cache object. If there is no already existing cache object for servicing the needs of the memory object 330 which triggered the bind request 302, a first pager command circuit 318 in the pager 304 is activated to send a create cache request 328 to the authenticated VMM 300. The create cache request 328 includes with it a pager object 336 which is to be associated with the newly created cache object 338. The newly created cache object 338 and an associated cache-rights-object 340 are associated with the pager object 336 (received with the create cache request) and then are returned to the pager 304 by an allocation mechanism 316 in the VMM 300. The pager 304 then may complete the original bind request 302, by returning 334 the new cache-rights-object 340 to the VMM 300 which made the original bind request. This return 334 is made via a second communications mechanism 312 connecting the pager 304 and the VMM 300. Finally, upon receipt of either an already existing cache-rights-object from path 332, or a new cache-rights-object from path 334, a locating circuit 314 in the VMM 300 uses the cache-rights-object received to find the cache object end of the cache object-pager object pair which was created. If the locating circuit 314 is unable to find a cache object pointed to by the cache-rights-object, the VMM 300 fails the original mapping request that initiated the bind request 302.

While the present invention has been described in terms of a presently preferred embodiment and in terms of some more general alternative embodiments, those skilled in the art will recognize that the invention is not limited to the embodiments described. Methods and apparatus for verifying VMMs and pagers, and for efficiently using the main memory space by not duplicating caches unnecessarily when requested to provide a cache for a memory object, can easily be envisioned by one skilled in these arts. The method and apparatus of the present invention can be practiced with modification and alteration within the spirit and scope of the appended claims. The description is thus to be regarded as illustrative instead of limiting the scope of the present invention.

What is claimed is:

1. In a virtual memory computer system having at least one central processing unit(CPU), with at least one main memory unit, with at least one executing program, and having at least one pager (the "pager"), and at least one virtual memory manager (VMM), a method performed by the computer system of managing the use of memory space in the at least one main memory unit comprising the steps of:
    a) using at least one memory object comprising a data structure which is an abstraction of memory that can be mapped into an address space, to represent an array of memory space used by the at least one executing program, and to encapsulate in the at least one memory object a value representing the length of the array of memory space and values representing the protection access rights to the array of memory space;
    b) pairing at least one cache object with at least one pager object and associating the cache object-pager object pair with the at least one memory object, wherein said at least one pager object authenticates a VMM and said VMM authenticates said at least one pager object; and
    c) using the cache object-pager object pair to page into and out of the at least one main memory unit, a set of data contained in the array of memory space indicated by said associated at least one memory object, whereby the functionality of encapsulating the representation of memory space and the values representing the memory attributes of length and access rights is separated from the functionality of paging the data into and out of the memory space represented by the values encapsulated in the memory object.

2. The method of claim 1 comprising the additional steps of:
    a) determining whether an already existing cache object is present which caches data for the memory object which triggered the request, the determination being made by the at least one pager implementing the memory object which was named in the request: and
    b) if the already existing cache object is present, using the already existing cache object and its paired pager object for performing the requested paging operation, whereby already existing memory space l:or paging is used to service a subsequent request for the same paged data.

3. The method according to claim 1 wherein the step of pairing the at least one cache object with the at least one pager object and associating the cache object-pager object pair with the at least one memory object further comprises the steps of:
    a) sending the at least one VMM's name, said name being an identifier to distinguish said at least one VMM from other VMMs, to the at least one pager by the at least one VMM and the at least one pager using the at least one VMM's name to authenticate the at least one VMM; and
    b) sending a unique pointer to the at least one pager by the at least one VMM and requiring the at least one pager to return the pointer to the at least one VMM, whereby the at least one pager authenticates the at least one VMM and the at least one VMM authenticates the at least one pager.

4. The method according to claim 3 wherein the step of sending the at least one VMM's name to the at least one pager by the at least one VMM and the at least one pager using the at least one VMM's name to authenticate the at least one VMM further comprises the steps, of:
    a) invoking a bind method, said method being an operation call, on the at least one memory object by the VMM, the invocation including the VMM's name; and
    b) determining by the at least one pager whether at least one vmm object exists corresponding to the at least one VMM's name and if so, designating the at least one vmm object an authenticated vmm object, said vmm object comprising operations and structure which is exported by the at least one VMM and used by pagers to create cache objects at the VMM.

5. The method according to claim 4 comprising the additional step of rejecting the bind request by the at least one pager if no authenticated vmm object can be found to correspond to the VMM name which was passed with the bind request.

6. The method according to claim 4 wherein the step of sending a unique pointer to the at least one pager by the at least one VMM and requiring the at least one pager to return the pointer to the at least one VMM further comprises the steps of:

a) issuing a create cache request accompanied by at least one pager object, to the at least one VMM designated by the authenticated vmm object, the request being issued by the at least one pager;

b) allocating by the at least one VMM a new cache object and a cache rights object, the cache rights object being an unforgeable object, and the new cache object and the cache rights object being associated with the at least one pager object which was passed to the at least one VMM with the create cache request, the new cache object and the at least one pager object being designated a new cache object-pager object pair, and the new cache object and the cache rights object being returned to the at least one pager which made the create cache request;

c) returning the cache rights object to the at least one VMM which invoked the bind operation call on the at least one memory object for execution by the at least one pager, the return being made by the at least one pager; and d) using the returned cache rights object by the at least one VMM to locate the associated new cache object-pager object pair.

7. The method according to claim 6 comprising the additional steps of:

a) determining whether an already existing cache object is present which caches data for the at least one memory object which triggered the bind request, the determination being made by the at least one pager handling the bind request; and b) returning to the at least one VMM which made the bind request the cache rights object which points to the already existing cache object.

8. The method of claim 1 wherein the at least one memory object comprises methods to contact the at least one pager that implements the at least one memory object for purposes of binding the range or a sub-range of memory space represented in the memory object to the cache object-pager object pair.

9. The method according to claim 8 wherein the at least one memory object further comprises methods to query the values representing the length of the range of memory space and the values representing the protection access rights to the range of memory space.

10. The method according to claim 2 wherein the computer system is a tightly-coupled multi-processor system having a plurality of CPUs.

11. The method according to claim 2 wherein the computer system is a loosely-coupled distributed multi-processor system having a plurality of CPUs.

12. In a virtual memory computer system having at least one central processing unit (CPU), with at least one main memory unit, and having at least one pager (the "pager"), and at least one virtual memory manager (VMM), said computer system also having at least one executing program which has at least one address space and at least one array of virtual memory space, a method performed by the computer of managing the use of memory space in the computer system comprising the steps of:

a) sending the name of the at least one VMM to the at least one pager by the at least one VMM and the at least one pager using the at least one VMM's name to authenticate the at least one VMM, said name being an identifier to distinguish said at least one VMM from other VMMs; and b) sending a unique pointer to the at least one pager by the at least one VMM and requiring the at least one pager to return the pointer to the at least one VMM, whereby the at least one pager authenticates the at least one VMM and the at least one VMM authenticates the at least one pager.

13. The method according to claim 12 wherein the step of sending the at least one VMM's name to the at least one pager by the at least one VMM and the at least one pager using the at least one VMM's name to authenticate the at least one VMM further comprises the steps, of:

a) requesting the at least one pager to bind the at least one array of virtual memory space to the at least one executing program's address space, the request, which includes the at least one VMM's name being made by the at least one VMM, said name being an identifier to distinguish said at least one VMM from other VMMs; and b) determining by the at least one pager whether the at least one VMM's name is authentic.

14. The method according to claim 13 comprising the additional step of rejecting the bind request by the at least one pager if the name of the at least one VMM which was passed with the bind request cannot be authenticated.

15. The method according to claim 13 wherein the step of sending a unique pointer to the at least one pager by the at least one VMM and requiring the at least one pager to return the pointer to the at least one VMM further comprises the steps of:

a) issuing a create cache request accompanied by at least one pager connection, to the authenticated at least one VMM, the request being made by the at least one pager:

b) allocating by the at least one VMM a new cache connection and a related unforgeable opaque token tidal acts as a pointer (the "token pointer"), the new cache connection and the related token pointer being associated with the at least one pager connection which was passed to the at least one VMM with the create cache request, the new cache connection and the at least one pager connection being designated a new cache connection-pager connection pair, and the new cache connection and the related token pointer being returned to the at least one pager which made the create cache request;

c) returning the related token pointer to the at least one VMM which made the bind request on the at least one pager, the return being made by the at least one pager; and d) using the returned related token pointer by the at least one VMM to locate the associated new cache connection-pager connection pair.

16. The method according to claim 15 comprising the additional steps of:

a) determining whether an already existing cache connection is present which caches data for the at least one array of virtual memory space which triggered the bind request, the determination being made by the at least one pager handling the bind request; and b) returning to the at least one VMM which made the bind request an already existing token pointer which points to the already existing cache connection.

17. The method according to claim 12 wherein the at least one VMM and the at least one executing program and the at least one pager and the trusted name server are object oriented programs; and wherein the at least one address space is an address space object, the at least one array of virtual memory space is a memory object, the new cache connection is a cache object, the at least one pager connection is a pager object, and the related unforgeable opaque token that acts as a pointer is an unforgeable cache rights object.

18. A computer system having at least one central processing unit(CPU), with at least one main memory unit, with at least one executing program, and having at least one pager (the "pager"), and at least one virtual memory manager (VMM), the computer system comprising;
   a) at least one memory object to represent an array of memory space used by the at least one executing program, wherein the at least one memory object encapsulates a value representing the length of the array of memory space and values representing the protection access rights to the array of memory space;
   b) a pairing device for pairing at least one cache object with at least one pager object and associating the cache object-pager object pair with the at least one memory object, wherein said at least one pager object authenticates a VMM and said VMM authenticates said at least one pager object; and
   c) pager circuitry for using the cache object-pager object pair to page into and out of the at least one main memory unit, a set of data contained in the range of memory space indicated by said associated at least one memory object, whereby the functionality of encapsulating the representation of memory space and the values representing the memory attributes of length and access rights is separated from the functionality of paging in and out the data contained in the memory space represented by the values encapsulated in the memory object.

19. The computer system of claim 18 further comprising;
   a) a first detection device coupled to the at least one pager for determining whether an already existing cache object is present which caches data for the memory object requesting a paging operation; and
   b) if the already existing cache object is present, selection circuitry coupled to the first detection device for using the already existing cache object and its paired pager object for perforating the requested paging operation, whereby already existing memory space for paging is used to service a subsequent request for the same paged data.

20. The computer system according to claim 18 wherein the pairing device for pairing the at least one cache object with the at least one pager object and associating the cache object-pager object pair with the at least one memory object comprises;
   a) an authentication device to allow the at least one pager to use the name of the at least one VMM to authenticate the at least one VMM, said name being an identifier to distinguish said at least one VMM from other VMMs; and
   b) a communications device for sending a unique pointer to the at least one pager by the at least one VMM and requiring the at least one pager to return the unique pointer to the at least one VMM, whereby the at least one pager authenticates the at least one VMM and the at least one VMM authenticates the at least one pager.

21. The computer system according to claim 20 wherein the authentication device to allow the at least one pager to use the at least one VMM's name to authenticate the at least one VMM further comprises:
   a) a first communications mechanism connecting the at least one VMM and the at least one pager which implements the at least one memory object, whereby the at least one VMM may invoke a bind operation on the memory object, the bind operation request including the at least one VMM's name; and
   b) a second detection device coupled to the at least one pager for determining whether at least one vmm object exists corresponding to the VMM's name, and if so, designating the at least one vmm object an authenticated vmm object, said vmm object comprising operations and structure which is exported by the at least one VMM and used by pagers to create cache objects at the VMM.

22. The computer system according to claim 21 further comprising a rejection mechanism for rejecting the bind request by the at least one pager if no authenticated vmm object can be found to correspond to the at least one VMM name which was passed with the bind request.

23. The computer system according to claim 21 wherein the communications device for sending a unique pointer to the at least one pager by the at least one VMM and requiring the at least one pager to return the unique pointer to the at least one VMM further comprises:
   a) a first pager command circuit coupled to the detection device for issuing a create cache request accompanied by at least one pager object, to the at least one VMM designated by the authenticated vmm object, the request being issued by the at least one pager,
   b) an allocation mechanism for allocating by the at least one VMM a new cache object and a cache rights object, the new cache object and the cache rights object being associated with the at least one pager object which was passed to the at least one VMM with the create cache request, the new cache object and the at least one pager object being designated a new cache object-pager object pair, and the new cache object and the cache rights object being returned to the at least one pager which made the cream cache request;
   c) a second communications mechanism for returning the cache rights object to the at least one VMM which invoked the bind operation on the memory object for execution by the at least one pager, the return being made by the at least one pager; and
   d) locating circuitry for using the returned cache rights object by the at least one VMM to locate the associated new cache object-pager object pair.

24. The computer system according to claim 23 further comprising a third detection device coupled to the at least one pager for determining whether an already existing cache object is present which caches data for the at least one memory object which triggered the bind request, the determination being made by the at least one pager handling the bind request, and if so, returning to the VMM which made the bind request the cache rights object which points to the already existing cache object.

25. The computer system of claim 18 wherein the at least one memory object comprises methods to contact the at least one pager that implements the at least one memory object for purposes of binding the range or a sub-range of memory space represented in the memory object to the cache object-pager object pair.

26. The computer system according to claim 25 wherein the at least one memory object further comprises methods to query the values representing the length of the range of memory space and the values representing the protection access rights to the range of memory space.

27. The computer system according to claim 19 wherein the computer system is a tightly-coupled multi-processor system having a plurality of CPUs.

28. The computer system according to claim 19 wherein the computer system is a loosely-coupled distributed multi-processor system having a plurality of CPUs.

29. A virtual memory computer system having at least one central processing unit (CPU), with at least one main memory unit, and having at least one pager (the "pager"), and having at least one virtual memory manager (VMM), the computer system also having at least one address space and at least one array of virtual memory space and at least one executing program, the computer system comprising:
   a) an authentication device to allow the at least one pager to use the name of the at least one VMM to authenticate the at least one VMM, said name being an identifier to distinguish said at least one VMM from other VMMs; and
   b) a communications device for sending a unique pointer to the at least one pager by the at least one VMM and requiring the at least one pager to return the unique pointer to the at least one VMM,
whereby the at least one pager authenticates the at least one VMM and the at least one VMM authenticates the at least one pager.

30. The computer system according to claim 29 wherein the authentication device to allow the at least one pager to use the at least one VMM's name to authenticate the at least one VMM further comprises:
   a) a first communications mechanism connecting the at least one VMM and the at least one pager, allowing the at least one VMM to request the at least one pager to bind the at least one array of virtual memory space to the at least one executing program's at least one address space, the bind request including the at least one VMM's name; and
   b) a second detection device coupled to the at least one pager for determining whether the at least one VMM's name is authentic.

31. The computer system according to claim 30 further comprising a rejection mechanism for rejecting the bind request by the at least one pager if the name of the at least one VMM which was passed with the bind request cannot be authenticated.

32. The computer system according to claim 31 wherein the communications device for sending a unique pointer to the at least one pager by the at least one VMM and requiring the at least one pager to return the unique pointer to the at least one VMM further comprises:
   a) a first pager command circuit coupled to the detection device for issuing a create cache request accompanied by at least one pager connection, to the at least one VMM, the request being issued by the at least one pager;
   b) an allocation mechanism for allocating by the at least one VMM a new cache connection and a related unforgeable token, the new cache connection and the related unforgeable token being associated with the at least one pager connection which was passed to the at least one VMM with the create cache request, the new cache connection and the at least one pager connection being designated a new cache connection-pager connection pair, and the new cache connection and the related unforgeable token being returned to the at least one pager which made the create cache request;
   c) a second communications mechanism for returning the related unforgeable token to the at least one VMM which invoked the bind request on the at least one pager, the return being made by the at least one pager; and
   g) locating circuitry for using the returned related unforgeable token by the at least one VMM to locate the associated new cache connection-pager connection pair.

33. The computer system according to claim 32 further comprising a third detection device coupled to the at least one pager for determining whether an already existing cache connection is present which caches data for the at least one range of virtual memory space which triggered the bind request, the determination being made by the at least one pager handling the bind request, and if so, returning to the at least one VMM which made the bind request the related unforgeable token which points to the already existing cache connection.

34. The computer system according to claim 29 wherein the at least one executing program and the at least one pager are object oriented programs; and wherein the at least one address space is an address space object, the at least one range of virtual memory space is a memory object, the new cache connection is a new cache object, the at least one pager connection is at least one pager object, and the related unforgeable token is a cache rights object.

* * * * *